(12) United States Patent
Roche

(10) Patent No.: US 10,661,415 B1
(45) Date of Patent: May 26, 2020

(54) AIR HAMMER WRENCH ATTACHMENT

(71) Applicant: Ryan P. Roche, Highlands Dr., CO (US)

(72) Inventor: Ryan P. Roche, Highlands Dr., CO (US)

(*) Notice: Subject to any disclaimer, the term of this patent is extended or adjusted under 35 U.S.C. 154(b) by 0 days.

(21) Appl. No.: 16/460,789

(22) Filed: Jul. 2, 2019

Related U.S. Application Data

(63) Continuation of application No. 16/369,091, filed on Mar. 29, 2019.

(51) Int. Cl.
*B25B 21/02* (2006.01)
*B25B 19/00* (2006.01)

(52) U.S. Cl.
CPC .............. *B25B 21/02* (2013.01); *B25B 19/00* (2013.01)

(58) Field of Classification Search
CPC ......... B25B 21/02; B25B 19/00; B25B 23/00; B25B 23/0007; B25B 23/0042; B25B 23/0028; B25B 1/06; B25G 1/005; B25G 1/043
USPC ...... 173/93; 81/463, 177.2, 465, 466, 177.1, 81/177.8
See application file for complete search history.

(56) References Cited

U.S. PATENT DOCUMENTS

| | | |
|---|---|---|
| 1,923,122 A | 8/1933 | Smith |
| 4,722,252 A | 2/1988 | Futcher et al. |
| 5,193,315 A | 3/1993 | Martinez |
| 6,354,178 B2 | 3/2002 | Pool |
| 6,769,334 B1 * | 8/2004 | Whitehead .............. B25B 19/00 81/177.85 |
| 7,089,833 B2 | 8/2006 | Hammann et al. |
| 2011/0209586 A1 * | 9/2011 | Wojick .................. B25B 13/505 81/90.4 |

* cited by examiner

*Primary Examiner* — Chelsea E Stinson
*Assistant Examiner* — Mary C Hibbert-Copeland
(74) *Attorney, Agent, or Firm* — Patent Law Offices of Rick Martin, P.C.

(57) ABSTRACT

An air hammer is connected to a transfer fixture that has a distal end with a transverse rod. A wrench has an open end with a jaw assembly that has a mouth to receive the transverse rod. The jaw assembly has a swivel tooth that is manually moved from an open position to allow insertion of the transverse rod into the mouth. For a working mode using the air hammer to hit the mouth, the tooth is moved to a locked mode. A ball and spring assembly ensures the transverse rod stays in the mouth during operation.

11 Claims, 5 Drawing Sheets

AIR HAMMER WRENCH ATTACHMENT

CROSS-REFERENCE PATENTS

The present non-provisional application claims priority to abandoned non-provisional application Ser. No. 16/369,091 filed Mar. 29, 2019 which is incorporated herein by reference in its entirety.

FIELD OF INVENTION

The present invention relates to using a prior art air hammer to drive a free end of a (closed end) wrench to loosen a stuck nut.

BACKGROUND OF THE INVENTION

Air hammers have been used to drive a wrench to loosen a stuck nut. U.S. Pat. No. 1,923,122 discloses an open end wrench with a free end having a custom receiver for an air hammer. The custom receiver is a swivel mounted ball that has an extension rod. The extension rod has a reduced stud 12 upon which an air hammer is connected. The swivel mount allows angular adjustment of the air hammer in relation to the wrench. The custom receiver cannot be removed from the wrench, thus use of the wrench without the air hammer is restricted.

U.S. Pat. No. 7,089,833 discloses a conventional socket 9 fit over a stuck nut. Next a handlebar 5, called a stabilizing fixture, is connected to the socket 9. At the socket 9 connection extends a lever arm 10. The free end of the lever arm 10 receives a transfer fixture 13 that connects to a standard pneumatic hammer shank 12 which in turn is attached to the pneumatic hammer 15. The user holds the handlebar 5 while activating the pneumatic hammer to hit the free end of the lever arm 10. No locking of the transfer fixture 13 to a cylinder rod 14 on the lever arm is disclosed. Thus, an accidental separation of the hammer from the lever arm is possible. This can be dangerous. Also the entire assembly cannot be used in tight places such as for a wheel hub removal.

U.S. Pat. No. 4,722,252 discloses an air powered ratchet head wrench with an air drive motor mounted inside the handle of the wrench. Very little leverage torque is provided. High speed loosening of a nut is provided.

What is needed in the art is a compact (closed) end wrench that removably receives an air hammer work end. A lock is needed to prevent a separation of the air hammer from the wrench during use. The present invention provides these features.

SUMMARY OF THE INVENTION

The main aspect of the present invention is to provide a safety latch on a (closed end) wrench for attachment of an air hammer.

Another aspect of the present invention is to allow the wrench to be used conveniently in a conventional manual manner.

Another aspect of the present invention is to provide a reliable locked engagement of an air hammer to the free end of the wrench.

Other aspects of this invention will appear from the following description and appended claims, reference being made to the accompanying drawings forming a part of this specification wherein like reference characters designate corresponding parts in the several views.

In operation a custom made wrench, could be open, closed or ratchet type, has a free end with a semi-circular jaw. The jaw has a simple two position locking tooth. The tooth has a spring assembly to maintain an open mode to insert an air hammer transfer fixture and a closed mode to lock the transfer fixture to the wrench. Thus, a safe operation of the air hammer is provided.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
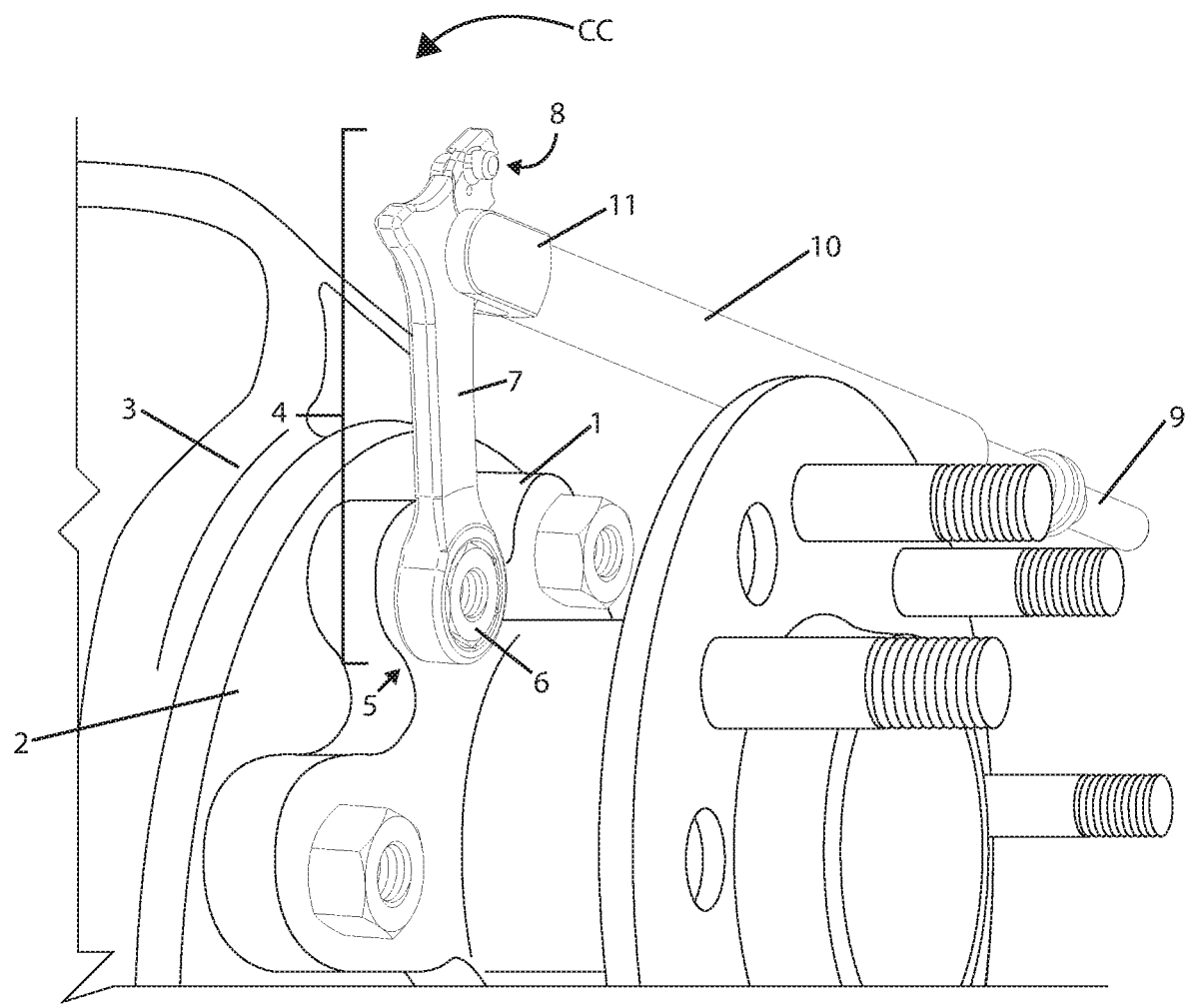
FIG. 1 is a front perspective view of the wrench in use in tight quarters.

Referring first to FIG. 1 a wheel 1 is being removed from the axle 2 of the vehicle 3. The wrench 4 has a working end 5 which in this embodiment is a closed end. Any type working end will work. The nut 6 has been mounted by the working end 5 of the wrench 4. The shank 7 connects the working end 5 to the jaw assembly 8 located at the free end of the wrench 4.

An air hammer attaches to proximal end 9 of the drive shaft 10. The distal end of drive shaft 10 has a fork type bracket 11, see FIG. 2. The crossbar 12 spans across the ends of fork type bracket 11. As the air hammer vibrates, the forces are transmitted from the crossbar 12 to the jaw 13. This vibrating force loosens the nut 6 to turn counter clockwise in the tight workspace shown. Thus, the mechanic gains great force leverage on nut 6 without risking slamming his hand into the vehicle 3.

Figure 2:
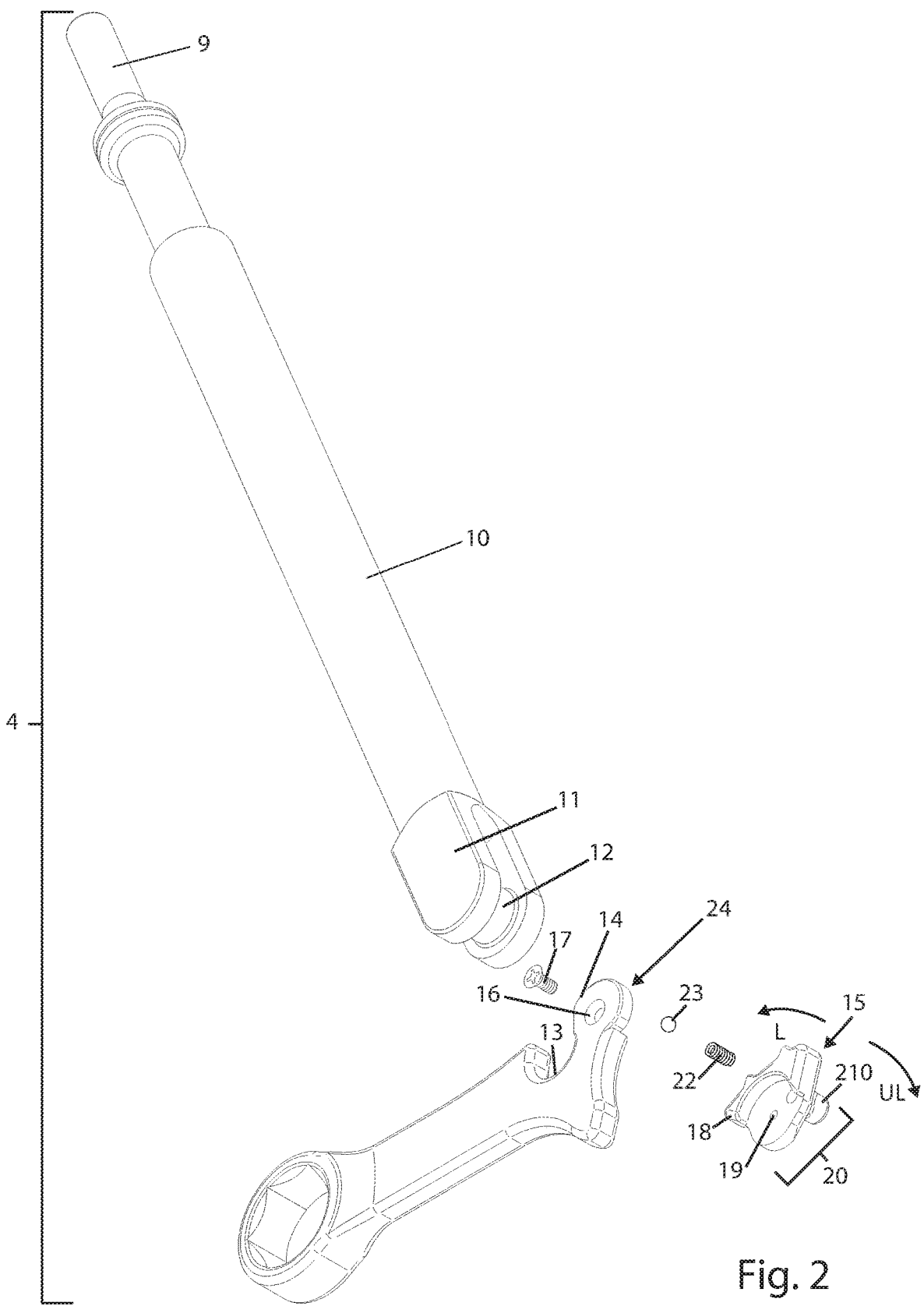
FIG. 2 is an exploded view of the wrench.

Referring next to FIG. 2 the jaw 13 has a distal edge 14. A tooth base 15 extends from distal end (also called the free end) of wrench 4. Mounting hole 16 receives a bolt that screws into hole 19 of the tooth assembly 20. The tooth assembly 20 is comprised of the locking tooth 18. The mechanic can push on ridge 21 to rotate the locking tooth 18 beyond the distal edge 14. In that position the crossbar 12 is locked in jaw 13. The tooth assembly 20 has a retainer 210 for the spring 22. The spring 22 urges the ball 23 against the outer surface 24 of the tooth base 15. The détente 25 in outer surface 24 locks the ball as the spring 22 urges the ball 23 into the détente 25. This mode keeps the crossbar 12 safely locked in jaw 13 as shown by arrow L.

To release the crossbar 12, the mechanic pushes on ridge 21 in direction unlock shown by arrow UL. This mechanical force by the mechanic forces the ball 23 out of détente 25 so the locking tooth 18 clears the distal edge 14.

Figure 3:
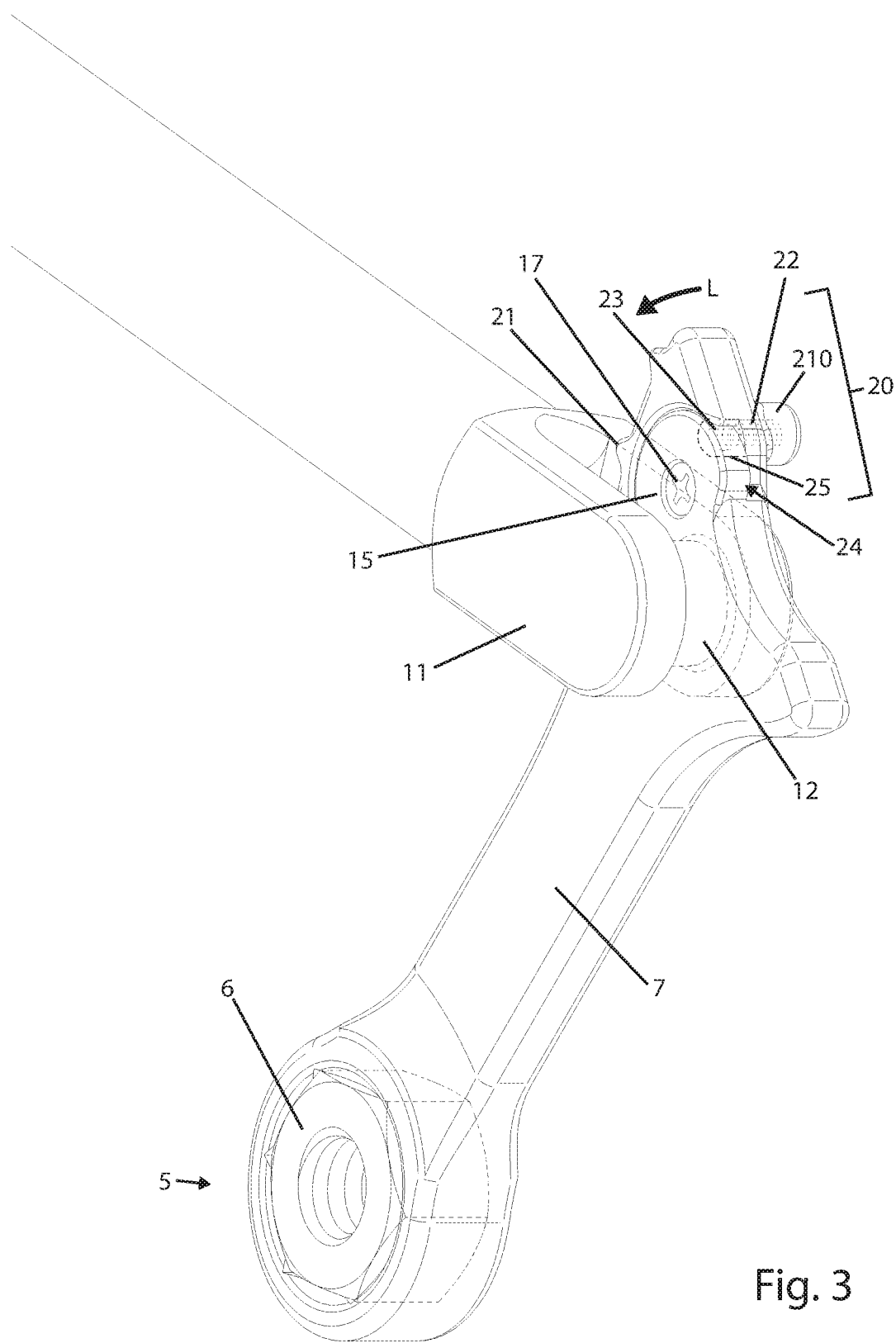
FIG. 3 is a top perspective view of the wrench locked to the air hammer.

Referring next to FIG. 3 arrow L shows the tooth assembly 20 in the locked mode. The crossbar 12 is locked in jaw 13 by locking tooth 18. The ball 23 is locked into détente 25 on face 24 of tooth base 15.

Figure 4:
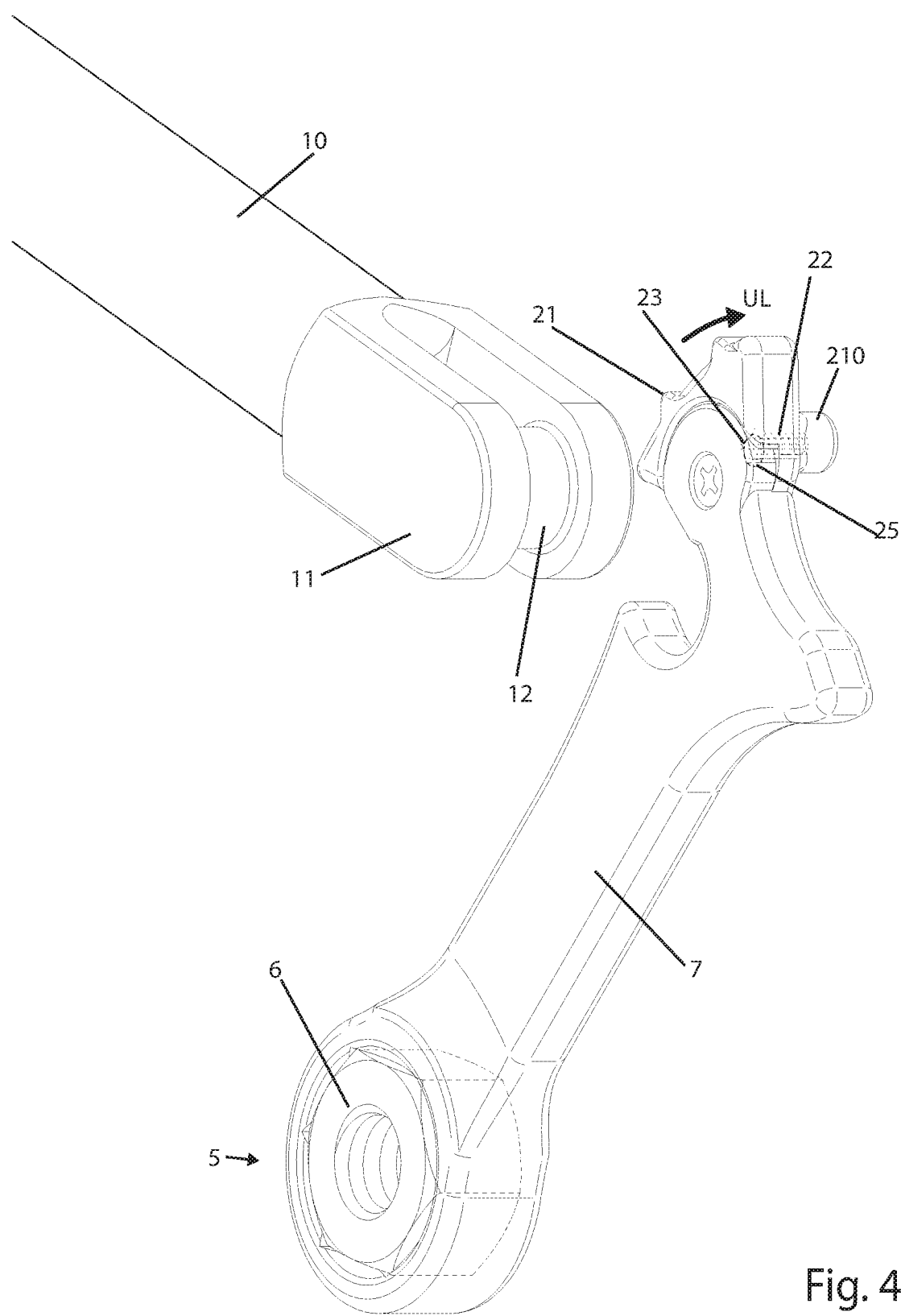
FIG. 4 is a top perspective view of the wrench unlocked from the air hammer.

In FIG. 4 the arrow unlock UL shows that the mechanic has pushed on ridge 21 and released ball 22 from détente 25.

Locking tooth 18 is now clear of distal edge 14. Crossbar 12 can be removed from jaw 13.

Figure 5:
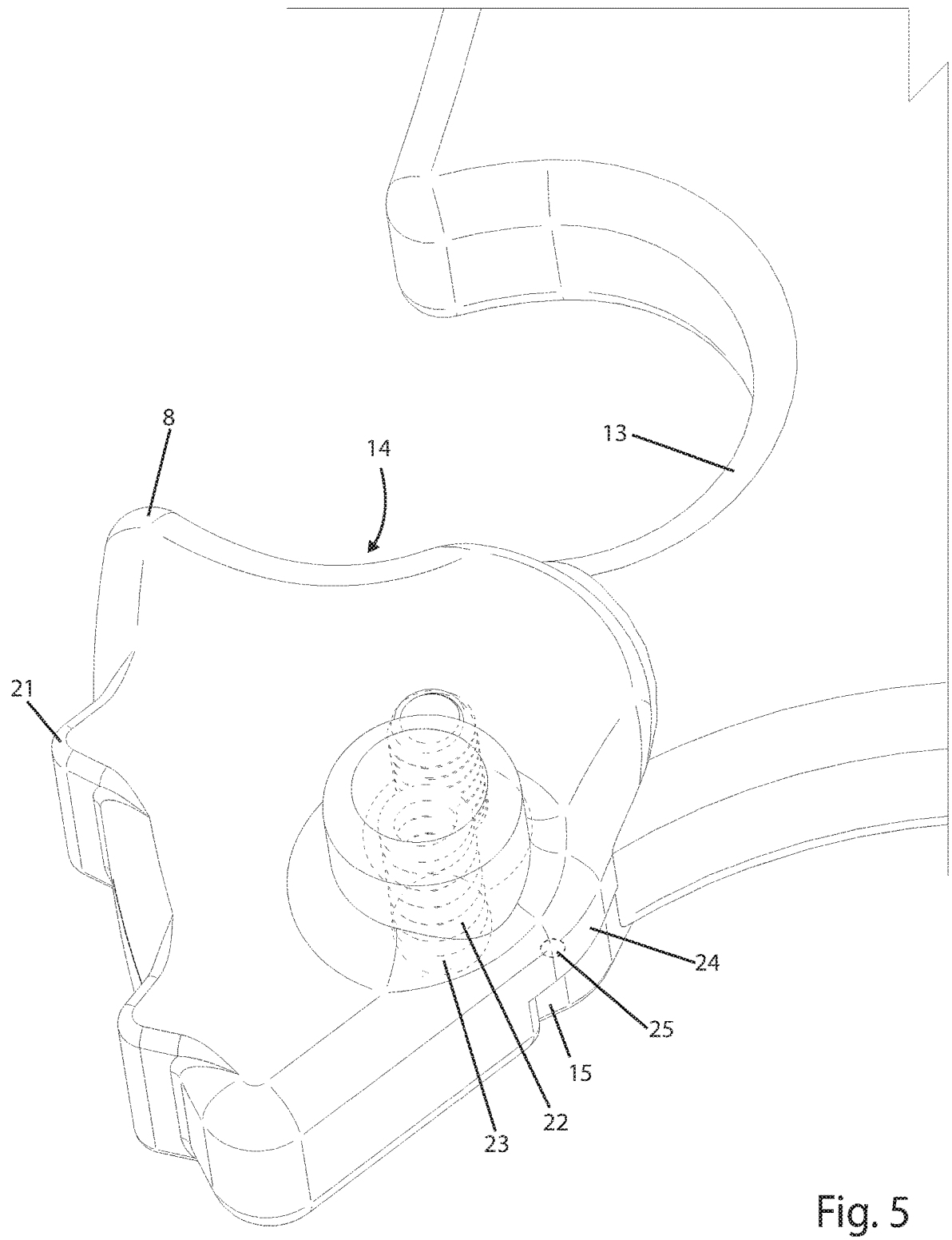
FIG. 5 is a side perspective view of the working face 24 of the tooth base 15.

In FIG. 5 the face 24 of tooth base 15 is shown. The open mode shows the ball 23 out of the détente 25.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A wrench having a working end with a socket to mount a nut, a shank connecting the working end to a free end, the free end comprising:
    a jaw having a curvature to accept a crossbar;
    a tooth base extending beyond the jaw away from the working end;
    a tooth assembly removably connected to the tooth base by an axle that allows the tooth assembly to rotate from a closed to an open mode;
    said tooth assembly having a locking tooth that can rotate beyond an open mouth end of the jaw to lock a crossbar therein;
    said tooth assembly having a latch ball and a spring that urges the latch ball into a face of the tooth base;
    wherein moving the tooth assembly to the open mode allows a crossbar that is attached to an air hammer to be placed in the curvature of the jaw; and
    wherein moving the tooth assembly to the closed mode forces the latch ball into a détente on the face of the tooth base, thereby preventing an accidental release of the crossbar from the jaw as the air hammer creates a rotational force on the working end.

2. The wrench of claim 1, wherein the axle further comprises a threaded bolt that screws into the tooth base.

3. The wrench of claim 1, wherein the tooth assembly further comprises a receptacle that secures the spring.

4. The wrench of claim 1, wherein the crossbar further comprises a pair of parallel arms that support it, said pair of parallel arms connected to a drive shaft that is removably connectable to the air hammer.

5. The wrench of claim 4, wherein the tooth assembly further comprises a finger ridge adjacent the locking tooth.

6. A wrench having a free end with a jaw assembly, said wrench comprising:
    a working end and a shank connected to the free end with the jaw assembly;
    said jaw assembly comprising a base extending from the shank and a swivel tooth mounted to the base;
    said jaw assembly having an open mouth to receive a crossbar of a fixture that is removably attached to an air hammer;
    said swivel tooth locks around the crossbar in a locked mode and is manually movable to an open mode; and
    wherein the locked mode further comprises a détente in the base that receives a spring loaded ball.

7. The wrench of claim 6, wherein the swivel tooth further comprises a rotatable platform having a receptacle to secure the spring and having a finger ridge to facilitate a swiveling of the rotatable platform from the open to the locked mode.

8. An air hammer and wrench combination, the combination comprising:
    an air hammer with a drive shaft;
    a connector at a distal end of the drive shaft,
    said connector comprising a pair of parallel arms with a transverse crossbar;
    a wrench having a working end and a shank connected to a free end;
    said free end having an open jaw sized to accept the crossbar;
    said free end having a base extending from a distal edge of the open jaw away from the working end;
    a rotating platform pivotally mounted on the base;
    said rotating platform having a tooth extending from an edge adjacent the distal end of the open jaw;
    wherein rotating the tooth inward in the open jaw locks the crossbar therein;
    wherein rotating the tooth outward away from the jaw releases the crossbar from the open jaw; and
    wherein a latch secures the tooth in the locked position.

9. The combination of claim 8, wherein the latch further comprises a détente on a face of the base and a spring loaded ball on the platform that latches into the détente in the locked position.

10. The combination of claim 9, wherein the platform further comprises a finger ridge to facilitate the rotating.

11. The combination of claim 10, wherein the working end further comprises a closed end.

* * * * *